United States Patent [19]

Mikami et al.

[11] Patent Number: 4,703,825

[45] Date of Patent: Nov. 3, 1987

[54] FAIRING WITH A VENTILATION SYSTEM

[75] Inventors: Tetsuo Mikami, Saitama; Terunari Saiki, Tokyo, both of Japan

[73] Assignee: Honda Giken Kogyo Kabushiki Kaisha, Tokyo, Japan

[21] Appl. No.: 875,301

[22] Filed: Jun. 17, 1986

[30] Foreign Application Priority Data

Jun. 17, 1985 [JP] Japan .............................. 60-91062[U]
Jun. 17, 1985 [JP] Japan .............................. 60-91063[U]

[51] Int. Cl.⁴ .............................................. B60R 11/02
[52] U.S. Cl. .................................. 180/229; 180/68.1; 180/219; 123/41.7; 296/78.1
[58] Field of Search ...................... 180/229, 219, 68.1, 180/68.2, 68.3, 68.4; 123/41.7; 296/78.1, 208

[56] References Cited

U.S. PATENT DOCUMENTS 3,172,397 3/1965 Schmuck ........................... 123/41.7
4,519,473 5/1985 Ochiai et al. ....................... 180/68.1
4,618,020 10/1986 Noda et al. ......................... 180/229

Primary Examiner—John J. Love
Assistant Examiner—Donn McGiehan
Attorney, Agent, or Firm—Irving M. Weiner; Joseph P. Carrier; Pamela S. Burt

[57] ABSTRACT

A fairing in a motorcycle includes a fairing body covering a motorcycle engine, an air outlet duct disposed in the fairing body and having an end opening at one side of the fairing body, a fan for assisting in discharging air through the air outlet duct out of the fairing body, and an electric motor for rotating the fan.

15 Claims, 5 Drawing Figures

FAIRING WITH A VENTILATION SYSTEM

BACKGROUND OF THE INVENTION

1. Field of the Invention

The present invention relates to a fairing for motorcycles, and more particularly to a motorcycle fairing having a ventilation system for discharging air heated by an engine and other heating elements out of the fairing.

2. Description of the Relevant Art

Some motorcycles have a multicylinder engine shaped as a V in side elevation and partly covered with a fairing. After the engine is started, heated air tends to remain stagnant in the V-shaped space between the engine cylinders. If the fairing has no structure for discharging such stagnant heated air, a carburetor disposed in such V-shaped space is heated by the stagnant air, causing so-called percolation.

An attempt has heretofore been made to provide the fairing with an air inlet hole and an air outlet hole in the vicinity of the engine for discharging heated air out of the fairing, thereby to prevent the carburetor and other accessories from being unduly heated by such heated air. However, an air flow caused by the air inlet and outlet hole in the fairing is not enough to discharge the heated air out of the fairing. Therefore, the fairing thus constructed fails to provide sufficient ventilation in the fairing especially when the motorcycle is at rest.

SUMMARY OF THE INVENTION

It is therefore a major object of the present invention to provide a motorcycle fairing having a ventilation system capable of effectively discharging, out of the fairing, heated air generated in a space defined between the cylinders of an engine and covered with the fairing, so that a carburetor and other accessories will be prevented from being thermally affected.

Another object of the present invention is to provide a motorcycle fairing having a ventilation system for allowing air to flow well in the fairing to prevent a carburetor and other accessories from being unduly heated, so that fuel can smoothly be supplied from the carburetor.

According to an embodiment of the present invention, a fairing for a motorcycle includes a fairing body adapted to cover a motorcycle engine, an air outlet duct disposed in the fairing body and having an end opening at one side of the fairing body, and a fan means disposed in the air outlet duct for discharging air through the air outlet duct out of the fairing body, the fan means comprising a fan and an electric motor operatively coupled to the fan.

According to another embodiment of the present invention, the fan means comprises a connecting shaft rotatably mounted on the fairing body and adapted to extend transversely of the motorcycle, a guide duct adapted to extend longitudinally of the motorcycle, a fan fixed to one end of the connecting shaft and disposed in an air outlet duct, and a turbine wheel mounted on the opposite end of the connecting shaft and rotatably disposed in the guide duct, whereby the fan can be rotated by the turbine wheel which is rotated by air flowing through the guide duct.

The above and further objects, details and advantages of the present ivention will become apparent from the following detailed description of preferred embodiments thereof, when read in conjunction with the accompanying drawings.

DETAILED DESCRIPTION OF THE PREFERRED EMBODIMENTS

Figure 1:
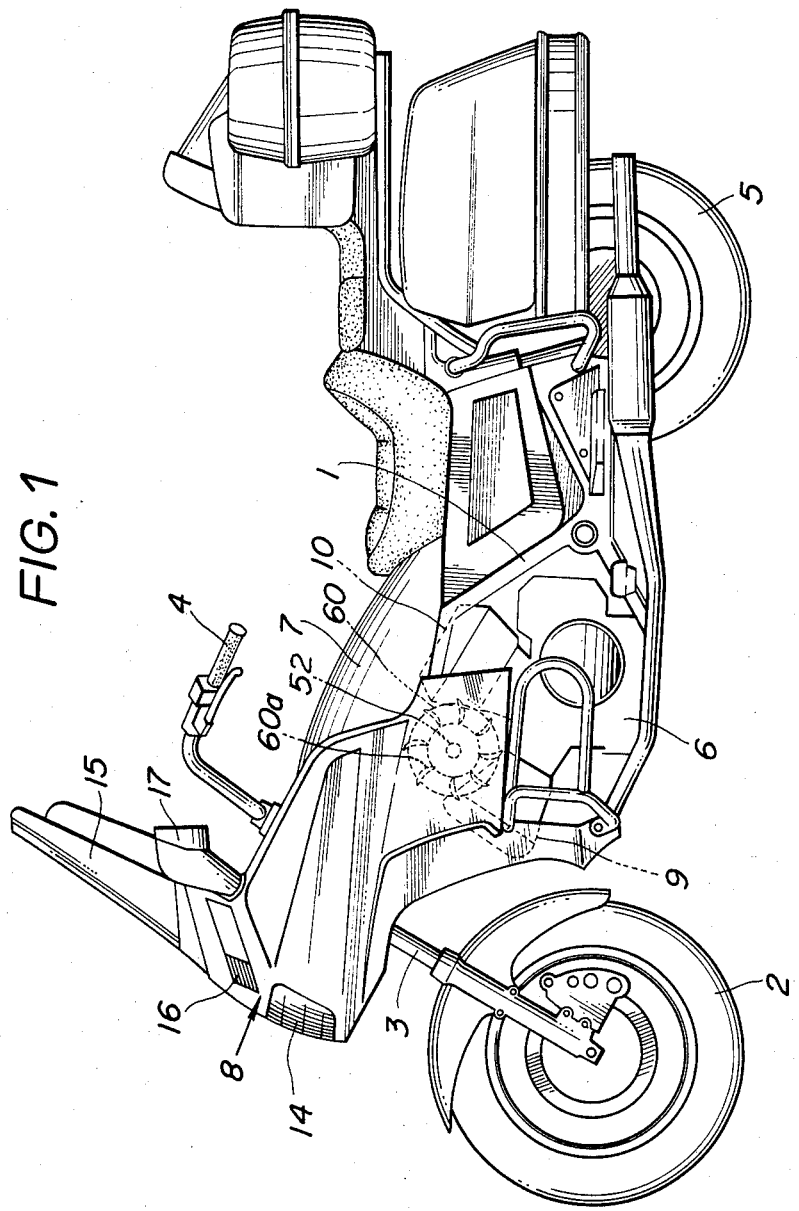
FIG. 1 is a side elevational view of a motorcycle with a V-shaped engine.

Like or identical reference characters denote like or identical parts throughout the several views.

As shown in FIG. 1, a motorcycle includes a frame 1, a front fork 3 supporting a front wheel 2 and steerably coupled to a handlebar 4 through a head tube (not shown) fixed to a front end portion of the frame 1, and a rear fork (not shown) mounted on a rear end portion of the frame 1 and supporting a rear wheel 5. A water-cooled four-cylinder engine 6 which is shaped as a V in side elevation is mounted on a front lower portion of the frame 1. A fuel tank 7 is supported on the frame 1 over the engine 6. A front portion of the fuel tank 7 and an area in front of the handlebar 4 are covered with a fairing, generally designated at 8.

Figure 2:
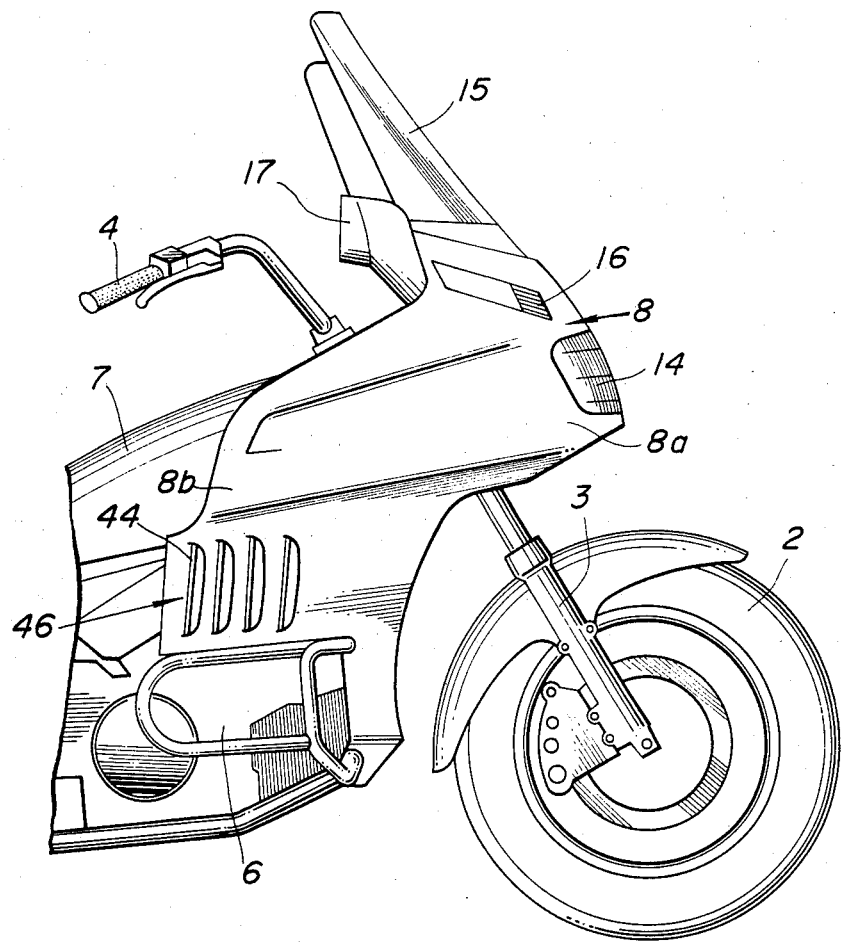
FIG. 2 is a fragmentary side elevational view of the motorcycle with a fairing mounted thereon.

As illustrated in FIGS. 1 and 2, the fairing 8 has a fairing body composed of a front portion 8a and a rear portion 8b. The front fairing portion 8a covers an upper portion of the front fork 3 and the area in front of the handlebar 4, whereas the rear fairing portion 8b covers the front portion of the fuel tank 7 and lateral sides of front and rear cylinders 9, 10 of the engine 6. A headlight 14 is mounted on the foremost end of the front portion 8a of the fairing 8, and a windshield 15 is mounted on the upper end of the front portion 8a. A turning signal lamp 16 and a mirror 17 are mounted on each of the lateral sides of the front portion 8a.

Figure 3:
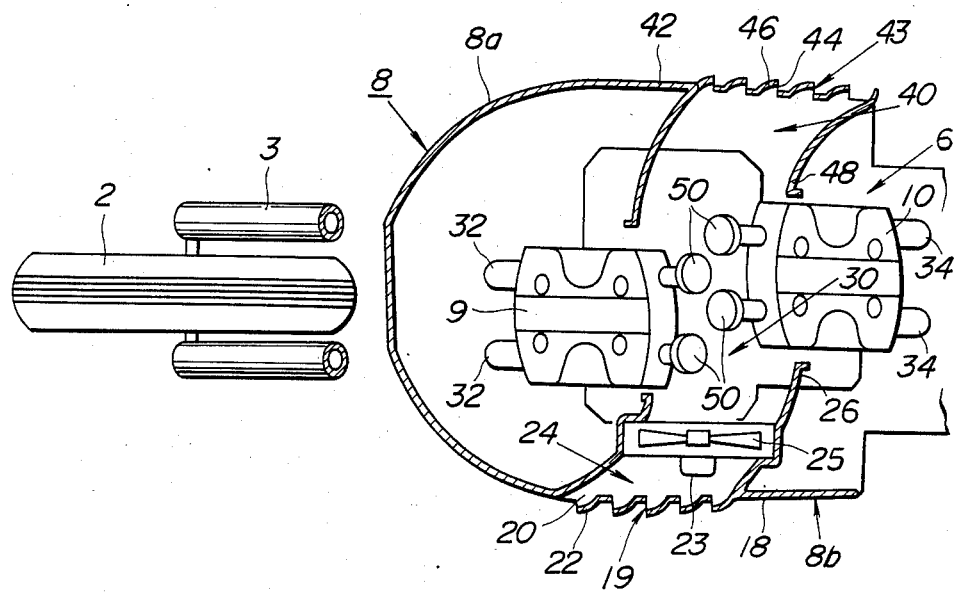
FIG. 3 is a horizontal cross-sectional view of a fairing ventilation system according to a first embodiment of the present invention.

FIG. 3 illustrates a fairing ventilation system according to a first embodiment of the present invention. The rear portion 8b of the fairing 8 has a lower side wall 18 including an air inlet 19 composed of vertical slits 20. The air inlet 19 has galleries 22 projecting forwardly for allowing air to be introduced easily into the fairing 8. A curved air inlet duct 24 extends inwardly and rearwardly from the air inlet 19. A fan 25 is rotatably disposed in a substantially intermediate portion of the air inlet duct 24, the fan 25 being coupled to an electric motor 23 and rotatable thereby. The air inlet duct 24 has an inner end 26 located adjacent to the front and rear cylinders 9, 10 and opening at one side of a V-shaped space 30 therebetween. Exhaust pipes 32, 34 extend rearwardly and downwardly from the front and rear cylinders 9, 10, respectively. A curved air outlet duct 40 extends forwardly and inwardly from an opposite lower side wall 42 of the rear portion 8b of the fairing 8. The air outlet duct 40 has an outer end coupled to an air outlet 43 composed of vertical slits 44 defined in the side wall 42 of the rear portion 8b of the fairing 8. The air outlet 43 includes galleries 46 projecting outwardly and rearwardly for discharging heated air easily from the fairing 8. The air outlet duct 40 has an inner end 48 located adjacent to the front and rear cylinders 9, 10 and opening at the other side of the V-shaped space 30. In the V-shaped space 30 between the inner end 26 of the air inlet duct 24 and the inner end 48 of the air outlet duct 40, there are disposed carburetors 50, 50 adjacent to the front and rear cylinders 9, 10 and connected thereto, respectively.

While the motorcycle is running, cool air is introduced from the air inlet 19 into the air inlet duct 24, and forced by the fan 25 rotated by the motor 23 into the V-shaped space 30. The cool air thus introduced forces engine-heated air from the V-shaped space 30 and discharges it out of the fairing 8 through the air outlet duct 40 and the air outlet 43. Therefore, heated air is prevented from being kept stagnant in the V-shaped space 30, and the carburetors 50 and other accessories are effectively cooled, with the result that fuel can smoothly be supplied from the carburetors 50. Even when the motorcycle is at rest, ventilation can be provided in the fairing 8 by energizing the motor 23 to rotate the fan 25.

Figure 4:
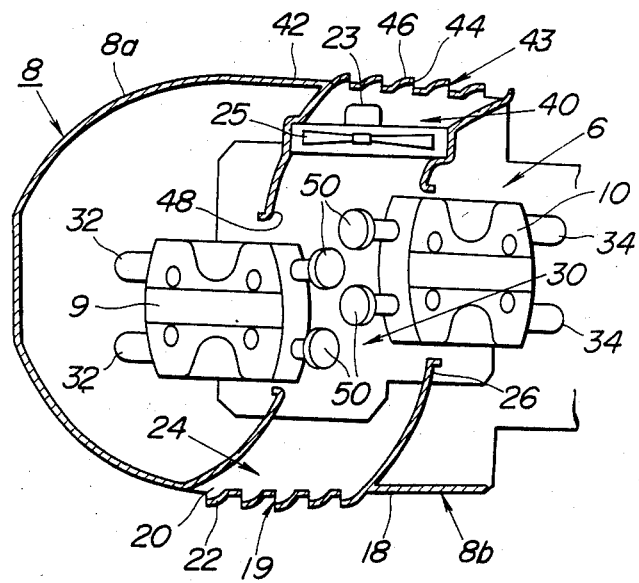
FIG. 4 is a horizontal cross-sectional view of a fairing ventilation system according to a second embodiment of the present invention.

FIG. 4 shows a fairing ventilation system according to a second embodiment of the present invention. The fairing ventilation system of the second embodiment differs from the fairing ventilation system of FIG. 3 in that the fan 25 is disposed in the air outlet duct 40. It can easily be understood that the fairing ventilation system of FIG. 4 operates in substantially the same manner as that in which the fairing ventilation system of FIG. 3 operates.

Figure 5:
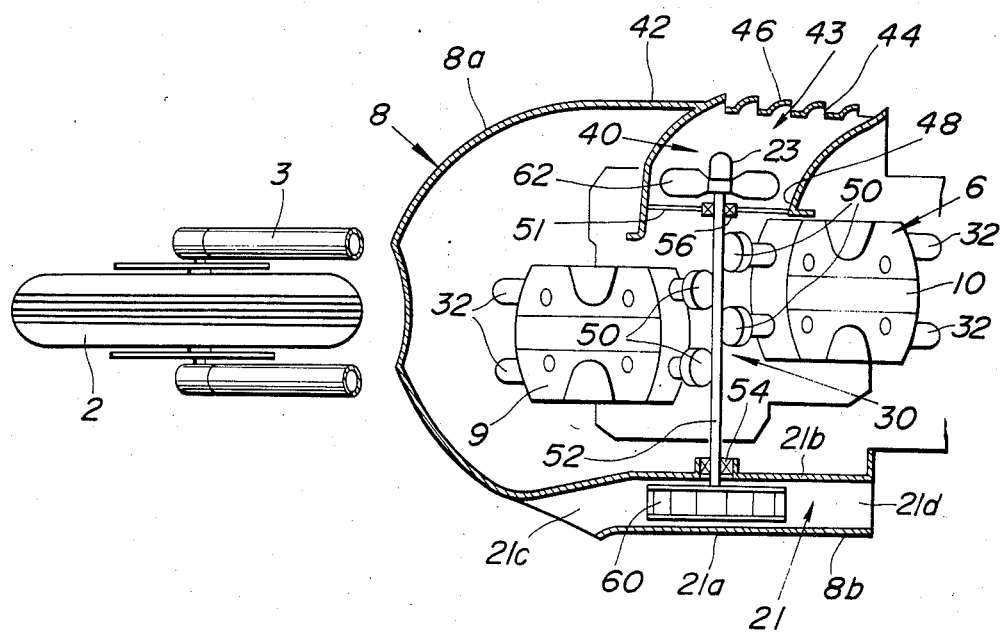
FIG. 5 is a horizontal cross-sectional view of a fairing ventilation system according to a third embodiment of the present invention.

A fairing ventilation system according to a third embodiment is illustrated in FIG. 5. A fairing 8 has a guide duct 21 formed on a lower side of the rear portion 8b thereof. The guide duct 21 extends longitudinally of the motorcycle. The guide duct 21 comprises an outer wall 21a and an inner wall 21b, and has an open front end defining an air inlet port 21c and an open rear end defining an air outlet port 21d. A curved air outlet duct 40 extends forwardly and inwardly from a lower side wall 42 of the rear portion 8b of the fairing 8, the lower side wall 42 being opposite to the guide duct 21. The air outlet duct 40 has an outer end coupled to an air outlet 43 composed of vertical slits 44 defined in the side wall 42 of the rear portion 8b of the fairing 8. The air outlet 43 includes galleries 46 projecting outwardly and rearwardly for discharging heated air easily from the fairing 8. The air outlet duct 40 has an inner end 48 located adjacent to the front and rear cylinders 9, 10 and opening at the side of the V-shaped space 30 which is remote from the guide duct 21. A stay 51 is supported on the inner end 48 of the air outlet duct 40. A connecting shaft 52 is rotatably supported by bearings 54, 56 on the inner wall 21b of the guide duct 21 and the stay 51, the connecting shaft 52 extending transversely over the V-shaped space 30. The connecting shaft 52 has one end projecting through the inner wall 21b into the guide duct 21, and a turbine wheel 60 is fixed to the projecting end of the connecting shaft 52 in the guide duct 21. The connecting shaft 52 has an opposite end projecting through the stay 51 into the air outlet duct 40, and a fan 62 is fixed to the projecting end of the connecting shaft 52 in the air outlet duct 40. Therefore, the turbine wheel 60 and the fan 62 are coupled by the connecting shaft 52 for corotation. As schematically shown in FIG. 1, the turbine wheel 60 has multiple vanes 60a which are arcuate in side elevation. The fan 62 is rotatable also by an electric motor 23 coupled thereto.

During travel of the motorcycle, air is introduced via the air inlet port 21c into the guide duct 21 to force the vanes 60a to rotate the turbine wheel 60 clockwise (FIG. 1). Therefore, the connecting shaft 52 is rotated by the turbine wheel 60 to rotate the fan 62. As the fan 62 is rotated, heated air is drawn from the V-shaped space 30 and discharged out of the fairing 8 through the air outlet duct 40 and the air outlet 43. While the motorcycle is at rest, heated air can be driven out of the fairing 8 by energizing the motor 23 to rotate the fan 62.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A fairing/ventilation system for a motorcycle with a V-shaped engine having front and rear cylinders spaced from each other, comprising:
    a fairing body adapted to cover the engine;
    an air outlet duct having an inner open end positioned adjacent to said front and rear cylinders of the engine and an outer end opening at one side of said fairing body; and
    fan means for discharging air through said air outlet duct out of said fairing body, said fan means including a fan and driving means operatively coupled to said fan.

2. A fairing ventilation system according to claim 1, wherein said fan and driving are disposed in said air outlet duct.

3. A fairing ventilation system according to claim 2, wherein said driving means comprises an electric motor.

4. A fairing in a motorcycle having an engine, comprising:
    a fairing body covering the engine;
    an air outlet duct disposed in said fairing body and having an end opening at one side of said fairing body; and
    fan means for discharging air through said air outlet duct out of said fairing body;
    said fan means including a connecting shaft rotatably mounted in said fairing body and extending substantially transversely of the motorcycle, a guide duct extending substantially longitudinally of the motorcycle, a fan mounted on one end of said connecting shaft and disposed in said air outlet duct, and a turbine wheel mounted on an opposite end of said connecting shaft and disposed in said guide duct, whereby said fan can be rotated by said turbine wheel which is rotated by air flowing through said guide duct.

5. A fairing ventilation system according to claim 1, further including an air inlet duct disposed in said fairing body and having an end opening at an opposite side of said fairing body.

6. A fairing ventilation system according to claim 5, wherein said air inlet duct has an inner open end disposed adjacent to said front and rear cylinders.

7. A fairing ventilation system according to claim 6, wherein said fan and driving means are disposed in said air inlet duct.

8. A fairing ventilation system according to claim 7, wherein said driving means comprises an electric motor.

9. A fairing/ventilation system according to claim 6, wherein said fan and driving means are disposed in said air outlet duct.

10. A fairing according to claim 4, wherein said engine is a V-shaped engine having front and rear cylinders spaced from each other and said air outlet duct has an inner end adjacent to said front and rear cylinders of the engine.

11. A fairing/ventilation system for a motorcycle with a V-shaped engine having front and rear cylinders spaced from each other, comprising:
- a fairing body adapted to cover said engine and having an air outlet duct, said air outlet duct extending from adjacent to one side of each of said front and rear cylinders of the engine to one side of said body;
- a fan for directing air through said air outlet duct to the exterior of said body; and
- means coupled to said fan for driving the same.

12. A fairing/ventilation system according to claim 11, wherein said fan and driving means are arranged in said air outlet duct.

13. A fairing/ventilation system according to claim 12, wherein said driving means comprises an electric motor.

14. A fairing/ventilation system according to claim 11, further including an air inlet duct extending from the other side of said fairing body to adjacent to the other side of each of said front and rear cylinders of the engine.

15. A fairing/ventilation system according to claim 14, wherein said fan and driving means are arranged in said air inlet duct.

* * * * *

UNITED STATES PATENT AND TRADEMARK OFFICE
CERTIFICATE OF CORRECTION

PATENT NO. : 4,703,825
DATED : November 3, 1987
INVENTOR(S) : Tetsuo MIKAMI et al.

It is certified that error appears in the above-identified patent and that said Letters Patent is hereby corrected as shown below:

```
Claim 2, line 1, (column 4, line 37), change "fairing
ventilation" to --fairing/ventilation--;
Claim 2, line 2, (column 4, line 38), after "driving"
insert --means--;
Claim 3, line 1, (column 4, line 40), change "fairing
ventilation to --fairing/ventilation--;
Claim 5, line 1, (column 4, line 62), change "fairing
ventilation" to --fairing/ventilation--;
Claim 6, line 1, (column 4, line 66), change "fairing
ventilation" to --fairing/ventilation--.
Claim 7, line 1, (column 5, line 1), change "fairing
ventilation" to --fairing/ventilation--;
Claim 8, line 1, (column 5, line 4), change "fairing
ventilation" to --fairing/ventilation--.
```

Signed and Sealed this

Seventeenth Day of May, 1988

*Attest:*

DONALD J. QUIGG

*Attesting Officer*  *Commissioner of Patents and Trademarks*